United States Patent [19]

Diamantoglou

[11] Patent Number: 5,068,269

[45] Date of Patent: Nov. 26, 1991

[54] CELLULOSIC MEMBRANES

[75] Inventor: Michael Diamantoglou, Erlenbach, Fed. Rep. of Germany

[73] Assignee: Akzo N.V., Arnhem, Netherlands

[21] Appl. No.: 575,690

[22] Filed: Aug. 31, 1990

[30] Foreign Application Priority Data

Sep. 2, 1989 [DE] Fed. Rep. of Germany ....... 3929150

[51] Int. Cl.$^5$ .......................... C08L 1/02; B01D 39/04
[52] U.S. Cl. .................................. 524/35; 210/500.29
[58] Field of Search ........................ 524/13, 15, 16, 31, 524/35, 36, 702, 703

[56] References Cited

U.S. PATENT DOCUMENTS

| | | | |
|---|---|---|---|
| 3,406,130 | 10/1968 | Nett | 524/46 |
| 3,424,702 | 1/1969 | Hata | 524/13 |
| 3,915,909 | 10/1975 | Schnoring et al. | 524/46 |
| 3,962,158 | 6/1976 | Mima et al. | 524/29 |
| 4,962,140 | 10/1990 | Diamantoglou | 524/35 |

OTHER PUBLICATIONS

D. E. Chenoweth et al, "Anaphylatoxin Formation During Hemodialysis: Effects of Different Dialyzer Membranes", *Kidney International*, vol. 24, pp. 764–769, 1983.

D. E. Chenoweth, "Biocompatibility of Hemodialysis Membranes", *Asaio Journal*, pp. 44–49.

*Primary Examiner*—Paul R. Michl
*Assistant Examiner*—Peter Szekely
*Attorney, Agent, or Firm*—Oliff & Berridge

[57] ABSTRACT

Cellulosic membranes, characterized by the fact that a mixture of cellulose and compounds of the type $$[A-]_n$$

is regenerated from solutions in cellulose solvents to form hollow fibers, tubes, or foils and regenerated in precipitants, where A is one or more acid or basic groups, selected from —COOH, —SO$_3$H, —PO$_3$H$_2$, —NH$_2$, —NHR, —NR$_2$, —$^+$NR$_3$, and —NR$_2$→O, where R=B and/or R=alkyl group with 1 to 6 carbon atoms and/or R=a phenyl group, and B is a straight-chain or branched, possibly substituted group, selected from alkyl groups with at least 10 carbon atoms, arylalkyl groups with at least 10 carbon atoms, or a polymerizable monomeric group such as alkene, alkyne, cycloolefin, arene, arylalkene, arylalkyne, allyl, and vinyl group, optionally substituted, in which the chain can be interrupted by heteroatoms such as O, S, N, P, B, and Si and n=1 or, in the case of polymerizable monomers, at least 10 and the percentage of cellulose in the mixture is at least 65%.

18 Claims, No Drawings

CELLULOSIC MEMBRANES

BACKGROUND OF THE INVENTION

The invention relates to cellulosic membranes. Cellulosic membranes are already well known and are used for dialysis, especially hemodialysis, electrodialysis, reverse osmosis, and ultrafiltration.

Cellulose is regenerated in these cases either by saponification of cellulose acetate or by precipitation with acids, alkalies, salt solutions, or water from "cuoxam" solutions, viscose solutions, or solutions in aprotic solvents with salts, as well as from solutions in tertiary amine oxide.

West German Patent 31 36 573 teaches a method of manufacturing a membrane in which a liquid mass, consisting of a reaction product manufactured at a temperature of 8° to 30° C. from 100 parts by weight of cuprammonium cellulose, produced from cellulose with an average degree of polymerization of 500 to 2500, with a mixture of 1 to 40 parts by weight of an ammonium or alkali metal salt of an acrylic acid/alkyl acrylate or methacrylate copolymer, a methacrylic acid/alkyl acrylate or methacrylate copolymer and/or a partial hydrolyzate of a polyalkyl acrylate or methacrylate with 10 to 70 equivalent percent carboxylic acid groups and a number average molecular weight of 500 to 200,000, is formed into a film or foil-type structure 5 to 30 $\mu$ thick, and the blank thus produced is dipped for coagulation and regeneration in 5–50% sulfuric acid, after which the ammonium or alkali metal salt of the polymer is washed out of the blank by dipping it in a 0.1 to 20% aqueous solution of a strong base, whereupon fine pores are formed in the blank essentially corresponding to the molecular weight of the salt.

In this method, the added polymer does not remain in the regenerated cellulose membrane, but is washed out completely when the pores are formed.

An object of the present invention is to make available cellulosic membranes with particular properties, including improved biocompatibility with hemodialysis membranes.

BRIEF SUMMARY OF THE INVENTION

The present invention relates to cellulose membrane comprising a mixture of cellulose and at least one compound of the formula $$[A-B]_n$$

wherein A is at least one acidic or basic group;

B is a straight-chain or branched, substituted or unsubstituted group, and is selected from the group consisting of alkyl groups having at least 10 carbon atoms, and arylalkyl groups having at least 10 carbon atoms, or a polymerizable substituted or unsubstituted monomeric group selected from the group consisting of alkene, alkyne, cycloolefin, arene, arylalkene, arylalkyne, allyl, and a vinyl group, wherein the chain can be interrupted by heteroatoms selected from the group consisting of O, S, N, P, B, and Si;

n=1 or, in the case of polymerizable monomers, at least 10, and the percentage of cellulose in the mixture is at least 65%.

DETAILED DESCRIPTION OF PREFERRED EMBODIMENTS

The object of the invention summarized above is achieved by cellulosic membranes characterized by the fact that a mixture of cellulose and compounds of the type $$[A-B]_n$$

is formed from solutions in cellulose solvents to form hollow fibers, tubes, or foils, and is regenerated in precipitants, where A is one or more acid or basic groups, selected from $-COOH$, $-SO_3H$, $-PO_3H_2$, $-NH_2$, $-NHR$, $-NR_2$, $-{}^+NR_3$, and $-NR_2 \rightarrow O$, where R=B and/or R=alkyl group with 1 to 6 carbon atoms and/or R=a phenyl group, and B is a straight-chain or branched, possibly substituted group, selected from alkyl groups with at least 10 carbon atoms, arylalkyl groups with at least 10 carbon atoms, or a polymerizable monomeric group such as alkene, alkyne, cycloolefin, arene, arylalkene, arylalkyne, allyl, or vinyl group, optionally substituted, in which the chain can be interrupted by heteroatoms such as O, S, N, P, B, and Si and n=1 or, in the case of polymerizable monomers, at least 10 and the percentage of cellulose in the mixture is at least 65%.

Substituents for B include R, CO—R, —CN, —NO$_2$, —OR and halogen, where R is an alkyl group, having 1 to 6 carbon atoms or a phenyl group.

The compounds $[A-B]_n$ must be soluble and stable in whatever cellulose solvents are selected and must be precipitated with the cellulose when it is regenerated. This is accomplished, for example, by adding the corresponding salts to the cellulose solvents which are converted to free acids or bases during the regeneration.

The cellulose solvent used most often for regenerating cellulose to form membranes as "cuoxam" (cuprammonium complex, Schweitzer's reagent). A large number of the compounds claimed for the mixture meet the requirements listed above, in other words, they are readily soluble and stable as salts in the "cuoxam" solution.

Accordingly, one embodiment of the invention is characterized by the fact that the cellulose solvent is "cuoxam," and in a special embodiment, in the case where A is a basic group, the precipitant may be an 8–15% alkali metal hydroxide solution. In the case where A is an acidic group, the precipitant may be a dilute acid. Preferably, the dilute acid is 5–12% sulfuric acid.

In addition, solutions in which the cellulose solvent is a mixture of aprotic solvents and salt of the elements Li, Ca, and/or Mg are especially suitable for regeneration of mixtures. The aprotic solvents are preferably dimethylacetamide and/or dimethylsulfoxide. In one preferred embodiment, LiCl and in another preferred embodiment, CaCl$_2$ is used. The preferred precipitant is water in this case.

Equally good cellulosic membranes are obtained by regeneration from solutions in tertiary aminoxide as the cellulose solvent, with diluents which preferably do not dissolve the cellulose, for example, water, being added to the solution. Water is likewise preferred as the precipitant.

One area of application for the membranes according to the invention is dialyzers, especially for artificial kidneys. In this connection, the biocompatibility of the membranes is of particular importance.

In addition to the fact that dialysis membranes made of synthetic or natural polymers can very easily cause the blood to coagulate when used in artificial kidneys, something which is largely prevented by appropriate drug treatment, a temporary decrease in the number of leukocytes often occurs when dialysis membranes made of regenerated cellulose are used in treating a kidney patient during the initial stage of dialysis treatment. This effect is known as leukopenia.

Leukopenia is a drop in the number of leukocytes (white blood cells) in the blood stream. The number of white blood cells in man is about 4,000 to 12,000 cells per cc.

Leukopenia during dialysis is most pronounced 15 to 20 minutes after the start, and the neutrophils (the leukocytes which can be stained with neutral dyes or simultaneously with acid and basic dyes) may disappear almost completely. Then, however, the number of leukocytes recovers within about one hour to nearly the initial value or even exceeds it.

If a new dialyzer is connected after the leukocytes recover, leukopenia occurs once again and to the same degree.

Cellulose membranes cause pronounced leukopenia. Even though the clinical significance of leukopenia has not been scientifically clarified, it is desirable to have a dialysis membrane for hemodialysis which does not exhibit the effect of leukopenia without at the same time having a negative effect on the other highly desirable properties of dialysis membranes made of regenerated cellulose.

In hemodialysis using membranes made from regenerated cellulose, in addition to leukopenia, a pronounced complement activation has also been observed. The complement system within the blood serum is a complex plasma enzyme system consisting of a number of components which serve in different ways to prevent injury caused by the penetration of foreign cells (bacteria, etc.). If antibodies against the invading organism are present, activation can be produced in a complement-specific manner by the complex of antibodies plus the antigen structures of the foreign cells; otherwise, complement activation takes place along an alternative pathway through special surface features of the foreign cells. The complement system is based on a number of plasma proteins. After activation, these proteins react specifically in a certain sequence with one another and eventually a cytotoxic complex is formed which destroys the foreign cell.

Peptides are released from individual components, causing inflammatory phenomena and can sometimes also have undesired pathological consequences for the organism. It is assumed that activation in hemodialysis membranes from regenerated cellulose takes place via the alternative pathway. These complement activations are determined objectively by determining the complement fragments $C_{3a}$ and $C_{5a}$.

In this connection, we would refer to the following papers: D.E. Chenoweth et al., Kidney International, Vol. 24, pages 764 ff, 1983, and D.E. Chenoweth, *Asaio Journal*. Vol. 7, pages 44 ff, 1984.

EXAMPLES

The invention will now be described in greater detail with reference to the examples below. As examples, these specific embodiments of the invention are illustrative only, and are not intended to limit the generic invention disclosed herein.

Complement activation based upon the $C_{5a}$ fragments was evaluated within the scope of the present invention. Heparinized blood plasma (300 ml) was recirculated in vitro over a period of 4 hours with a plasma flow of 100 ml/min through a dialyzer with 1 m² effective exchange area. The $C_{5a}$ fragments in the plasma were determined using the RIA method (Upjohn test). The relative complement activation for the point in time measured was calculated by taking the ratio between the concentration at the time the sample was taken and the initial value in percent. The measured value after 4 hours of recirculation time was used for evaluation. Flat membranes were incubated for 3 hours with heparinized plasma, after which the $C_{5a}$ fragments were determined.

The average degree of polymerization (DP) was determined in a cuene solution according to D N 54270.

EXAMPLES 1

Membranes made of linters cellulose and polymethacrylic acid/ butyl methacrylate copolymer A. Polymer synthesis: polymethacrylic acid/butyl methacrylate sodium salt Using a 1-liter 3-necked flask with a stirrer, dropping funnel, and condenser, 400 ml of methyl isobutyl ketone was added. After flushing the apparatus with nitrogen, the methyl isobutyl ketone was heated to 90° C. and a solution of 51.6 g (0.60 mole) of methacrylic acid, 56.8 g (0.40 mole) butyl methacrylate, and 0.9 g benzoyl peroxide in 200 ml methyl isobutyl ketone was added dropwise within 2 hours. The mixture was stirred for another 22 hours at 90° C. under nitrogen, whereupon the polymer precipitated out. After cooling, the mixture was diluted with 500 ml of ethanol and the reaction product neutralized with 24.0 g (0.6 mole) of sodium hydroxide dissolved in 30 ml of water. The polymer was filtered off by suction, rinsed with ethanol, and dried in a vacuum drying oven at 60° C.

Yield: 110.5 g (90.9% of theoretical yield)

B. Membrane Preparation

In a cuoxam solution of the usual composition, 70 parts linters cellulose (DP=1400, measured in cuene) and 30 parts of the polymer obtained earlier (Example 1A) were dissolved and processed to produce flat membranes using the known procedure. In contrast to membranes made of pure cellulose, the membranes exhibit a very low complement activation. $C_{5a}$ reduction is 97%.

EXAMPLES 2-4

Using linters cellulose and the polymer of Example 1A, by analogy with Example 1B, flat membranes were prepared with different polymer contents and their complement activation was determined on the basis of the $C_{5a}$ fragment (Table 1).

TABLE 1

Flat membranes made of linters cellulose and polymethacrylic/butyl methacrylate copolymer

| Example | linters cellulose (Parts) | Polymer of Example 1A, (Parts) | $C_{5a}$ Reduction % |
|---|---|---|---|
| 2 | 80 | 20 | 100 |

TABLE 1-continued

Flat membranes made of linters cellulose and polymethacrylic/butyl methacrylate copolymer

| Example | linters cellulose (Parts) | Polymer of Example 1A, (Parts) | $C_{5a}$ Reduction % |
|---|---|---|---|
| 3 | 85 | 15 | 99 |
| 4 | 95 | 5 | 88 |

EXAMPLE 5

Membranes of linters cellulose and polystyrene/maleic acid copolymer

By analogy with Example 1B, flat membranes were prepared from 85 parts of linters cellulose and 15 parts of polystyrene/maleic acid sodium salt prepared by the known method. In comparison to membranes of pure cellulose, the $C_{5a}$ reduction is 100%.

EXAMPLE 6

Membranes of linters cellulose and polystyrene/maleic acid copolymer

By analogy with Example 1B, flat membranes were prepared from 90 parts linters cellulose and 10 parts polystyrene/maleic acid sodium salt prepared by the known method. In contrast to pure cellulose membranes, they exhibited no $C_{5a}$ activation.

EXAMPLE 7

Membranes of linters cellulose and polyacrylic acid/butyl methacrylate copolymer A. Polymer synthesis: polyacrylic acid/butyl methacrylate sodium salt By analogy with Example 1A, 104.4 g of polyacrylic acid butyl methacrylate sodium salt was synthesized from 43.2 g (0.60 mole) acrylic acid and 56.8 g (0.40 mole) butyl methacrylate in methyl isobutyl ketone.

B. Membrane preparation

By analogy with Example 1B, flat membranes were prepared from 95 parts linters cellulose and 5 parts of the previously obtained polymer (Example 7A). In comparison to membranes made of pure cellulose, the $C_{5a}$ reduction was 80%.

EXAMPLE 8

Membranes of linters cellulose and polyacrylic acid/butyl acrylate copolymer

A. Polymer synthesis: polyacrylic acid/butyl acrylate sodium salt

By analogy with Example 1A, 112.7 g polyacrylic acid/butyl acrylate sodium salt was synthesized from 28.4 g (0.4 mole) acrylic acid and 76.8 g (0.6 mole) butyl acrylate in methyl isobutyl ketone.

B. Membrane Preparation

By analogy with Example 1B, flat membranes were prepared from 85 parts linters cellulose and 15 parts of the previously obtained polymer (Example 8A). In comparison to membranes of pure cellulose, the $C_{5a}$ reduction was 58%.

EXAMPLE 9

In a 1-liter, 3-neck flask, 16.2 g (0.10 mole) cellulose (DP=1400, measured in cuene solvent) was suspended in 354 g (4.07 mole) dimethylac-etamide and activated under nitrogen for 30 minutes at 145° C. After cooling to 100° C., 30 g (0.70 mole) LiCl was added, whereupon the temperature rose 5–10° C.; it was then cooled rapidly to room temperature (RT always 20–25° C.) and agitated overnight. Then 5.8 g (0.2 mole) stearic acid was mixed into the clear viscous solution. The solution was filtered, de-aerated, and processed into flat membranes. In comparison to pure cellulose membranes, the $C_{5a}$ reduction was 92%.

EXAMPLES 10–15

By analogy with Example 9, the membranes listed in Table 2 were prepared from linters cellulose and additives.

TABLE 2

| Example | Cellulose (Parts) | Additive | Additive (Parts) | $C_{5a}$ Reduction % |
|---|---|---|---|---|
| 10 | 85 | $C_{11}H_{23}COOH$ | 15 | — |
| 11 | 75 | $C_{17}H_{33}COOH$ | 25 | 98 |
| 12 | 89 | $C_{12}H_{25}/C_{14}H_{29}-NH_2$ | 11 | — |
| 13 | 87 | $C_{16}H_{33}/C_{18}H_{37}-NH_2$ | 13 | 87 |
| 14 | 82 | $(C_{12}H_{25}/C_{14}H_{29})_2NH$ | 18 | 60 |
| 15 | 80 | $C_{14}H_{29}N(CH_3)_2 \rightarrow O$ | 20 | 45 |

I claim:

1. A cellulose membrane comprising a mixture of cellulose and at least one compound of the formula $$[A-B]_n$$

wherein A is at least one acidic or basic group;

B is a straight-chain or branched, substituted or unsubstituted group, and is selected from the group consisting of alkyl groups having at least 10 carbon atoms and arylalkyl groups having at least 10 carbon atoms, or a polymerizable substituted or unsubstituted monomeric group selected from the group consisting of alkene, alkyne, cycloolefin, arene, arylalkene, arylalkyne, allyl, and vinyl group, wherein the chain can be in errupted by heteroatoms selected from the group consisting of O, S, N, P, B, and Si;

n=1 or, in the case of polymerizable monomers, at least 10, and the percentage of cellulose in the mixture is at least 65%.

2. A cellulosic membrane according to claim 1, wherein A is selected from the group consisting of —COOH, —SO$_3$H, —PO$_3$H$_2$, —NH$_2$, NHR, NR$_2$, —$^+$NR$_3$, and NR$_2$→O, wherein R is selected from the group consisting of B, an alkyl group having from 1 to 6 carbon atoms and a phenyl group.

3. A cellulosic membrane according to claim 1, produced by dissolving said cellulose and said compound in a cellulose solvent and subsequently co-precipitating said cellulose and said compound with a precipitant to form a membrane.

4. A cellulosic membrane according to claim 3, wherein the cellulose solvent is cuoxam.

5. A cellulosic membrane according to claim 3, wherein A is a basic group and the precipitant is an 8–15% alkali metal hydroxide solution.

6. A cellulosic membrane according to claim 3, wherein A is an acidic group and the precipitant is a dilute acid.

7. A cellulosic membrane according to claim 6, wherein the dilute acid is 5–12% sulfuric acid 8. A cellulosic membrane according to claim 3, wherein the cellulose solvent is a mixture of aprotic solvents and a salt of at least one element selected from the group consisting of Li, Ca, and Mg.

9. A cellulosic membrane according to claim 8, wherein the aprotic solvent is selected from the group consisting of dimethylacetamide, dimethyl sulfoxide, and a mixture of both.

10. A cellulosic membrane according to claim 8, wherein said salt is LiCl.

11. A cellulosic membrane according to claim 8, wherein said salt is $CaCl_2$.

12. A cellulosic membrane according to claim 8, wherein said precipitant is water.

13. A cellulosic membrane according to claim 3, wherein said cellulose solvent comprises a tertiary amine oxide.

14. A cellulosic membrane according to claim 13, wherein said precipitant is water.

15. A cellulosic membrane according to claim 13, wherein said cellulose solvent further comprises a diluent which does not dissolve cellulose.

16. A cellulosic membrane according to claim 1 in the form of a hollow fiber, tube or foil.

17. A cellulosic membrane according to claim 1 which is non-porous.

18. A cellulosic membrane according to claim 1 wherein B is substituted with a substituent selected from the group consisting of R, CO—R, —CN, —$NO_2$, —OR and halogen, and wherein R is an alkyl group of from 1 to 6 carbon atoms or a phenyl group.

* * * * *

UNITED STATES PATENT AND TRADEMARK OFFICE
CERTIFICATE OF CORRECTION

PATENT NO. : 5,068,269            Page 1 of 2
DATED : November 26, 1991
INVENTOR(S) : Michael DIAMANTOGLOU It is certified that error appears in the above-identified patent and that said Letters Patent is hereby corrected as shown below:

IN THE ABSTRACT:

Line 9, change "$-+NR_3$" to -- $-\overset{+}{NR_3}-$ --.

Col. 1,      line 48, after "to" insert --a--

Col. 2,      line 16, change "$-^{+NR}{}_3$" to -- $-\overset{+}{NR_3}-$ --;

line 64, change "amineoxide" to --amine oxide--.

Col. 4,      line 23, change "D N" to --DIN--.

Col. 5,     line 66, change "dimethylac-etamide" to --dimethylacetamide--.

Col. 6,     line 38, change "in errupted" to --interrupted--.

UNITED STATES PATENT AND TRADEMARK OFFICE
CERTIFICATE OF CORRECTION

PATENT NO. : 5,068,269

DATED : November 26, 1991

INVENTOR(S) : Michael Diamantoglou

It is certified that error appears in the above-identified patent and that said Letters Patent is hereby corrected as shown below:

Col. 6, claim 2, line 47, change "$-^{+}NR_3$" to $-\ -NR_3^{+}-$.

claim 7, line 64, after "acid" (second occurrence) insert --.--.

Signed and Sealed this

Twenty-seventh Day of April, 1993

*Attest:*

MICHAEL K. KIRK

*Attesting Officer*     Acting Commissioner of Patents and Trademarks